United States Patent

Espe et al.

[11] Patent Number: 5,832,894
[45] Date of Patent: Nov. 10, 1998

[54] VARIABLE AIR INTAKE DEVICE

[75] Inventors: Carsten Espe, Thalmassing; Mathias Scheytt, Neutraubling, both of Germany

[73] Assignee: Siemens Aktiengesellschaft, Munich, Germany

[21] Appl. No.: 808,788

[22] Filed: Feb. 28, 1997

Related U.S. Application Data

[63] Continuation of PCT/DE95/01172 Aug. 31, 1995 published as WO96/07022 Mar. 7, 1996.

[30] Foreign Application Priority Data

Aug. 31, 1994 [DE] Germany ............... 44 31 022.6

[51] Int. Cl.⁶ .................... F02M 35/108; F02D 9/08
[52] U.S. Cl. ............. 123/336; 123/184.43; 123/184.48; 123/337
[58] Field of Search ................... 123/336, 337, 123/184.43, 184.44, 184.48, 184.49, 184.53

[56] References Cited

U.S. PATENT DOCUMENTS

| 4,898,144 | 2/1990 | Kobayashi et al. | 123/184.43 |
| 4,945,865 | 8/1990 | Lee | 123/184.37 |
| 5,669,350 | 9/1997 | Altmann et al. | 123/337 |

FOREIGN PATENT DOCUMENTS

| 2 613 428 | 10/1988 | France . |
| 87 04 464.1 U1 | 7/1987 | Germany . |
| 40 17 049 A1 | 11/1991 | Germany . |
| 40 41 786 A1 | 6/1992 | Germany . |
| 2 210 665 | 6/1989 | United Kingdom . |

Primary Examiner—Tony M. Argenbright
Assistant Examiner—Hieu T. Vo
Attorney, Agent, or Firm—Herbert L. Lerner; Laurence A. Greenberg

[57] ABSTRACT

A variable air intake device for an internal combustion engine includes a first manifold, air intake pipes for connecting the first manifold to individual cylinders of the internal combustion engine to supply intake air, and a second manifold connected to the air intake pipes. The second manifold has a portion between the first manifold and the cylinders. The portion has further mutually closely adjacent air intake pipes. The further air intake pipes have walls with mutually adjacent ports and the further air intake pipes have bearing collars. A closing device has shafts and closing elements in the form of elongate bodies in the vicinity of the bearing collars. Each of the elongate bodies is rotatably mounted as a flap on a respective one of the shafts for closing and opening the ports as a function of a parameter of the internal combustion engine.

5 Claims, 2 Drawing Sheets

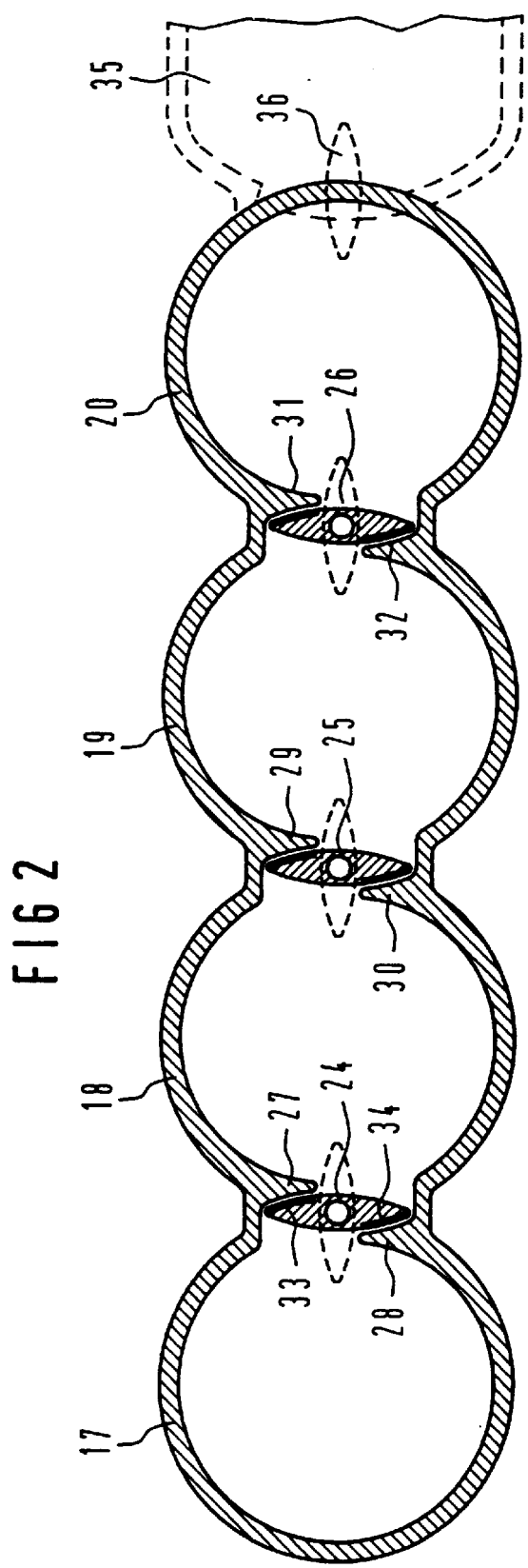

VARIABLE AIR INTAKE DEVICE

CROSS-REFERENCE TO RELATED APPLICATION

This application is a Continuation of International Application Serial No. PCT/DE95/01172, filed Aug. 31, 1995, published as WO96/07022 Mar. 7, 1996.

BACKGROUND OF THE INVENTION

Field of the Invention

The invention relates to a variable air intake device for an internal combustion engine, having a first manifold connected to individual cylinders of the internal combustion engine through air intake pipes for the supply of intake air, a second manifold formed by air intake pipes in a portion between the first manifold and the cylinders, the air intake pipes being closely adjacent to one another in that portion and having mutually adjacent ports facing one another in walls thereof, and a closing device for closing or opening the ports with closing elements as a function of a parameter of the internal combustion engine.

A device of that type is known, for example, from German Utility Model DE 87 04 464 U, in which arcuate intake pipe sections are displaceable in one another through the use of a drive device, so as to make the intake pipe length variable. However, a device of that type has the disadvantage of only permitting leakproofing of the intake pipes in an overlap region to be mastered in a manner involving a high outlay.

It is also known to provide an air intake device in which each intake pipe has a perforation on its path from the manifold to the cylinder of the internal combustion engine. The perforation is connected to the manifold through a short pipe section. A flap which is disposed in that pipe section is rotatable and closes or opens the interior of the pipe section, depending on the operating state of the internal combustion engine. Due to the curved shape of the intake pipes and the short pipe sections, it is not possible to close the entry region in a flush manner through the use of the flap. In other words, the flap has to be set back somewhat into the short pipe section. Consequently, with the flap closed, a so-called dead volume, which adversely influences the flow of the intake air, occurs upstream of the flap in the direction of the intake pipe facing the cylinder. A device which is described in U.S. patent application Ser. No. 08/782,428, filed Jan. 15, 1997, eliminates that disadvantage.

The above-known devices use curved intake pipes which can be easily adapted to local conditions prevailing in the engine space. However, changeover devices in the form of rotatable closing parts or sliding devices, as in German Utility Model DE 87 64 464 U, necessitate a high outlay in terms of construction due to the curved shape.

For that reason, it has become known to use elongate air intake devices, through the use of which the geometrical shape of devices of that type could be simplified.

Published UK Patent Application GB 2 210 665 A discloses an intake pipe system with a manifold and with individual intake pipes which lead to the individual cylinders and each of which includes an elongate inner and outer pipe, the connection locations of which are fastened on one or more emergency valves, so that an air flow becomes possible between the connection locations when the emergency valve is actuated. For that purpose, in that region the individual intake pipes are disposed around a hollow body having ports on its periphery which are connected to individual ports of the intake pipes. The ports are capable of being opened or closed through the use of a sleeve disposed in the hollow body. In the closed state of the ports, the volume in the hollow body forms a volume through which intake air does not flow. In other words, the air located in it does not move, so that when the ports are opened, the stationary air mass first has to be accelerated in order to influence the operating behavior of the internal combustion engine. Moreover, the overall size of a device of that type is increased because of the provision of a hollow body.

The intake pipe system which is known from German Published, Non-Prosecuted Patent Application DE 40 17 049 A1 behaves in a similar way. There too, when required, an additional air volume is cut in through an additional pipe connection, through which the combustion air does not flow.

SUMMARY OF THE INVENTION

It is accordingly an object of the invention to provide a variable air intake device, which overcomes the hereinafore-mentioned disadvantages of the heretofore-known devices of this general type, which provides a reliable changeover that works as simply as possible between at least two operating positions of the intake device and which does not require any separate additional air volume to be cut in or interposed, so that after the closing device is actuated, the configuration responds quickly and the overall size as a whole is not increased.

With the foregoing and other objects in view there is provided, in accordance with the invention, a variable air intake device for an internal combustion engine, comprising a first manifold; air intake pipes for connecting the first manifold to individual cylinders of an internal combustion engine to supply intake air; a second manifold connected to the air intake pipes, the second manifold having a portion between the first manifold and the cylinders, the portion having further mutually closely adjacent air intake pipes, the further air intake pipes having walls with mutually adjacent ports, and the further air intake pipes having bearing collars; and a closing device having shafts and closing elements in the form of elongate bodies in the vicinity of the bearing collars, each of the elongate bodies being rotatably mounted as a flap on a respective one of the shafts for closing and opening the ports as a function of a parameter of the internal combustion engine.

Thus, in an operating state of the internal combustion engine, for example when a high torque is required when the speed of the internal combustion engine is low, the air intake device can be set in a simple way, without the size of the entire configuration of the device having to be increased, in such a way that the long air intake pipes located upstream of the air intake device come into full effect. In another operating state, for example when high power is required at high speeds of the internal combustion engine, regions of the air intake pipes are changed over to a further manifold, that is to say, in terms of effect, they become short intake pipes, and the first manifold then no longer exerts virtually any influence, so that the internal combustion engine can produce the high power.

The device can be constructed in a particularly space-saving manner since, at least in the region of the second manifold, the air intake pipes are disposed closely adjacent one another, and the closely adjacent regions of the air intake pipes have ports which can in each case be closed or opened through the use of closing elements of the changeover device.

In accordance with another feature of the invention, the shafts are each disposed in a respective one of the portions having the closely adjacent air intake pipes and in the vicinity of a respective one of the ports.

In accordance with a further feature of the invention, the elongate bodies have regions facing the bearing collars, the bearing collars have regions facing the elongate bodies, and the regions of the elongate bodies and/or of the bearing collars have a predetermined appreciable roughness.

In accordance with an added feature of the invention, the closing elements are constructed as elongate oval bodies, particularly as oval flaps having two vanes or wings, which makes a reliable mounting of simple construction possible.

In accordance with a concomitant feature of the invention, the closing device has a variable adjustment speed.

By providing a bearing collar in each case in the changeover region and by virtue of the geometrical shape of the closing flap, the air flowing through the intake pipes is scarcely influenced at all, particularly in the closed position of the closing elements, so that the intake air is prevented from experiencing turbulence.

The device is particularly suitable for changing over the air intake device between two operating states of the internal combustion engine. It goes without saying that further switching positions of the closing flap are, of course, conceivable, for example when the closing elements are only half-closed, in order to allow continuous transition of the operating behavior of the internal combustion engine from one operating state to the other. Similar results can be achieved if the switching speed of the switching or adjusting device is made correspondingly variable, particularly as a function of the operating conditions of the internal combustion engine.

Other features which are considered as characteristic for the invention are set forth in the appended claims.

Although the invention is illustrated and described herein as embodied in a variable air intake device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is an enlarged, fragmentary, cross-sectional view taken along a line II—II of FIG. 1, in the direction of the arrows.

DESCRIPTION OF THE PREFERRED EMBODIMENTS

Figure 1:
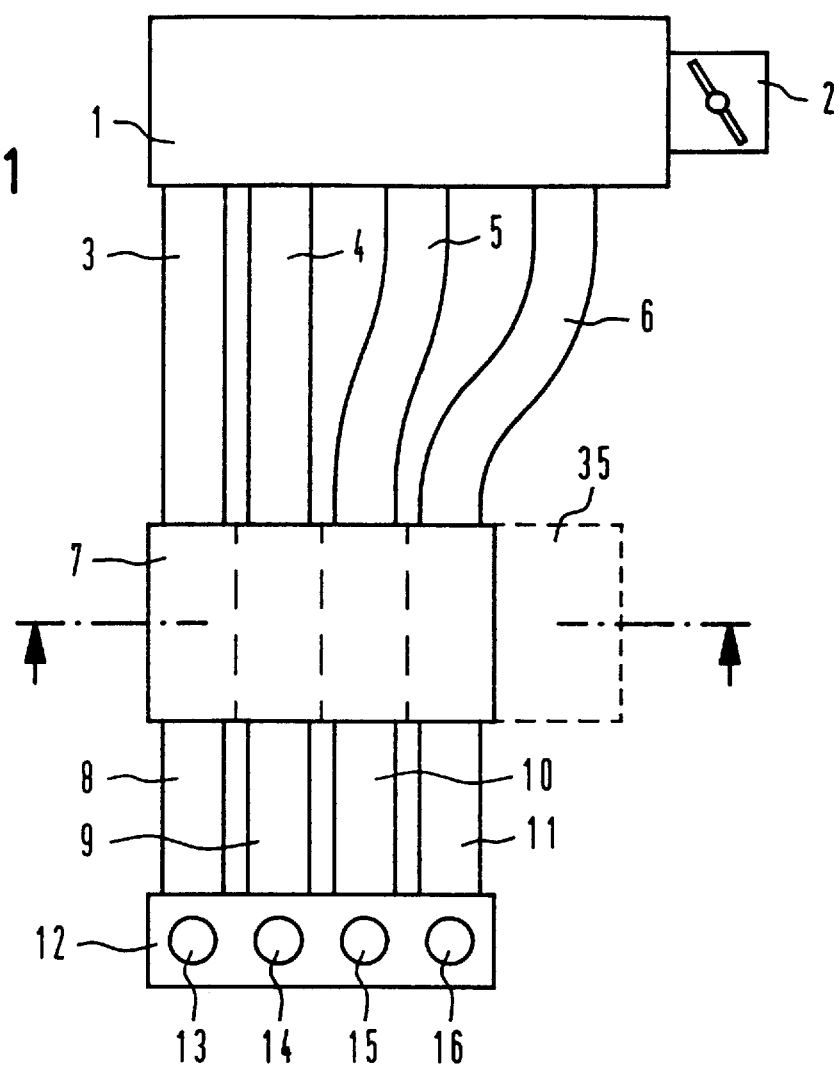
FIG. 1 is a diagrammatic, top-plan view of a first embodiment of an air intake device according to the invention for an internal combustion engine.

Referring now to the figures of the drawings in detail and first, particularly, to FIGS. 1 and 2 thereof, there is seen a first embodiment of an air intake device which includes a first manifold 1 that is connected to a throttle flap connection piece 2. The first manifold 1 is connected to intake pipes 3, 4, 5, 6 which are in turn connected through a second manifold 7 and other intake pipes 8, 9, 10, 11 to a cylinder head 12 of a non-illustrated internal combustion engine. Individual cylinders of the internal combustion engine are indicated by reference numerals 13, 14, 15, 16.

As can be seen particularly clearly from FIG. 2, the second manifold 7 has a portion between the first manifold 1 and the cylinders 13–16 that includes individual closely adjacent further air intake pipes 17, 18, 19, 20 which are mutually adjacent at locations having ports 21, 22, 23 that face one another and which can be closed or opened in each case by an oval wing-shaped or vane-shaped flap 24, 25, 26, as is shown by a horizontal flap position indicated by broken lines. However, the flaps can also assume intermediate positions. In the region of each port 21, 22, 23, each of the pipes 17, 18, 19, 20 has two respective bearing collars 27, 28; 29, 30; 31, 32, onto which a vane of the flap can come to bear in each case in order to close the respective port. The flaps are centrally mounted, in each case through the use of a respective shaft 37, 38, 39, in the closely adjacent region of the pipes 17, 18, 19, 20, so that in the opened state of the ports, the vanes of the flaps only project into the respective pipe as little as possible. The shafts and the further pipes form a closing device.

In the region of the bearing collars, the flaps can have appreciable roughness which is indicated by reference numerals 33 and 34, in order to increase leakproofing at those locations and in order to prevent the flaps from sticking.

Conversely, however, the bearing collars can also have roughness in that region. It is also conceivable for each flap in the bearing region as well as the respective bearing collar to have some roughness.

The pipes of the manifold 7 can be separate pipes which can be connected, in particular welded or adhesively bonded, to the pipes 3 to 6 and 8 to 11 of the intake device.

In an alternative version of the manifold 7, the latter can be extended by a further volume 35 which is indicated by broken lines. This is achieved through the use of a further flap 36 which connects this further volume 35 to the volumes of the pipes of the manifold 7.

The intake pipes 8, 9, 10, 11 and the intake pipes 17, 18, 19, 20 can have diameters which are different from one another. Furthermore, the pipes can have a geometrical shape which deviates from a round shape.

Figure 3:
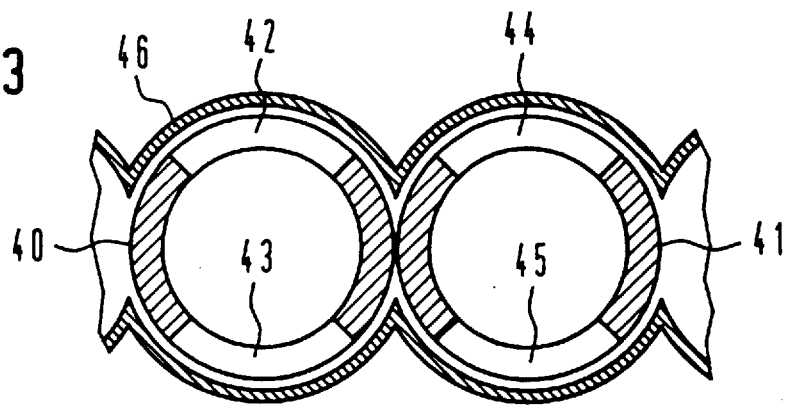
FIG. 3 is a fragmentary, perspective view of a second embodiment of an air intake device.

FIG. 3 shows a second embodiment of a manifold 7 for a variable air intake device. Two hollow cylinders 40, 41 can be seen in this case. The hollow cylinders have ports 42, 43, 44, 45 extending in the longitudinal direction of the hollow cylinders. The hollow cylinders 40, 41 are disposed in a housing 46 which at least partially closely surrounds the hollow cylinders. Depending on the rotary position of the hollow cylinders which is obtained through the use of a nonillustrated drive device, the ports 42, 43, 44, 45 can be positioned in such a way that they are located opposite one another, with the result that a continuous volume of the hollow cylinders can be formed, thereby forming a second manifold.

We claim:

1. A variable air intake device for an internal combustion engine, comprising:

a first manifold;

air intake pipes for connecting said first manifold to individual cylinders of an internal combustion engine to supply intake air;

a second manifold connected to said air intake pipes, said second manifold having a portion between said first manifold and the cylinders, said portion having further mutually closely adjacent air intake pipes, said further air intake pipes having walls with mutually adjacent ports, and said further air intake pipes having bearing collars; and a closing device having shafts and closing elements in the form of elongate bodies in the vicinity of said bearing collars, each of said elongate bodies being rotatably mounted as a flap on a respective one of said shafts for closing and opening said ports as a function of a parameter of the internal combustion engine.

2. The air intake device according to claim 1, wherein said shafts are each disposed in a respective one of said portions having said closely adjacent air intake pipes and in the vicinity of a respective one of said ports.

3. The air intake device according to claim 1, wherein said elongate bodies have regions facing said bearing collars, said bearing collars have regions facing said elongate bodies, and at least one of said regions has a predetermined appreciable roughness.

4. The air intake device according to claim 3, wherein said elongate bodies are formed of oval flaps having two vanes.

5. The air intake device according to claim 1, wherein said closing device has a variable adjustment speed.

\* \* \* \* \*